US008645381B2

(12) United States Patent
Buss et al.

(10) Patent No.: US 8,645,381 B2
(45) Date of Patent: Feb. 4, 2014

(54) DOCUMENT TAXONOMY GENERATION FROM TAG DATA USING USER GROUPINGS OF TAGS

(75) Inventors: Helen C. Buss, Newcastle (GB); Cerys Willoughby, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 13/169,980

(22) Filed: Jun. 27, 2011

(65) Prior Publication Data

US 2012/0330953 A1  Dec. 27, 2012

(51) Int. Cl.
*G06F 7/00* (2006.01)
*G06F 17/30* (2006.01)
*G06F 7/08* (2006.01)

(52) U.S. Cl.
CPC ............ *G06F 7/08* (2013.01); *G06F 17/30412* (2013.01); *G06F 17/30589* (2013.01); *G06F 17/30598* (2013.01); *Y10S 707/956* (2013.01)
USPC ........... 707/737; 707/748; 707/749; 707/777; 707/778; 707/797; 707/829; 707/956

(58) Field of Classification Search
CPC ................ G06F 7/08; G06F 17/30412; G06F 17/30589; G06F 17/30598
USPC ......... 707/737, 748, 749, 777, 778, 797, 829, 707/956
See application file for complete search history.

(56) References Cited

U.S. PATENT DOCUMENTS

| 6,078,913 | A  | * | 6/2000  | Aoki et al. ............. 707/999.002 |
|-----------|----|---|---------|--------------------------------------|
| 6,442,545 | B1 | * | 8/2002  | Feldman et al. ....... 707/999.006   |
| 7,266,548 | B2 | * | 9/2007  | Weare .................... 707/999.003|
| 2004/0267709 | A1 | * | 12/2004 | Ji et al. ............... 707/3      |
| 2006/0004747 | A1 | * | 1/2006  | Weare .................... 707/5     |
| 2006/0212461 | A1 | * | 9/2006  | Meysman ................. 707/100    |
| 2008/0195595 | A1 | * | 8/2008  | Masuyama et al. .......... 707/5     |
| 2009/0177955 | A1 | * | 7/2009  | Liu et al. ................ 715/200  |
| 2009/0287674 | A1 | * | 11/2009 | Bouillet et al. .......... 707/5     |
| 2010/0030552 | A1 | * | 2/2010  | Chen et al. ............... 704/9    |
| 2011/0149350 | A1 | * | 6/2011  | Matsuda et al. .......... 358/462    |
| 2011/0282878 | A1 | * | 11/2011 | Bird et al. .............. 707/740   |

\* cited by examiner

*Primary Examiner* — Phong Nguyen
(74) *Attorney, Agent, or Firm* — Steven M. Greenberg, Esq.; Carey, Rodriguez, Greenberg & O'Keefe

(57) ABSTRACT

Embodiments of the invention provide a novel and non-obvious method, system and computer program product for generating a document taxonomy based upon tag data in groupings of tags. In an embodiment of the invention, a method for generating a document taxonomy based upon tag data in groupings of tags has been claimed. The method includes retrieving into memory of a host computer different groupings of tags for correspondingly different documents providing a bottom-up view of the documents. The method further includes deriving a folksonomy from the groupings of tags for the documents and organizing the folksonomy into a hierarchy of nodes. Of note, each of the nodes can be associated with a different subject in the folksonomy. Finally, the method includes publishing the hierarchy of nodes as a taxonomy for the documents to provide a top-down view of the documents.

9 Claims, 2 Drawing Sheets

DOCUMENT TAXONOMY GENERATION FROM TAG DATA USING USER GROUPINGS OF TAGS

BACKGROUND OF THE INVENTION

1. Field of the Invention

The present invention relates to content tagging and more particularly to taxonomy generation from tag data.

2. Description of the Related Art

Content browsing refers to the retrieval and presentation of electronic content in a browser client. Content generally can include electronic documents, messages, audio, audiovisual and video materials and imagery. Most commonly, content can be stored in a server environment and published for access by content consumers over a computer communications network such as the global Internet. Content consumers, in turn, can retrieve content over the network by reference to a network address for the content. Once retrieved, the content can be presented in a browser client including not only conventional visual browsers such as the venerable Web browser, but also in document viewers and editors, alternative browsers such as those deployed in pervasive devices and those supporting different modes of presentation such as the audible presentation of material.

Given the vast amount of content published for accessibility over the Internet, modern content browsers provide a mechanism for ably retrieving previously accessed content. Known as a "bookmark" or "favorite" (collectively referred to as a bookmark), end users can record content of interest as a bookmark. Subsequently, end users can access a list of bookmarks in order to recall the content of interest without being compelled to recall from memory the precise uniform resource indicator (URI) for the content of interest. While bookmarking reflects the personal experience of individual users, social bookmarking provides a foundation for users within a social group to store, organize, share and search the bookmarks collectively established by the users within the social group.

In the operation of a social bookmarking system, users save links to memorable content. Unlike traditional bookmarks however, in a social bookmarking system the links subsequently can be published for public inspection and use so as to provide a communal repository of bookmarks. Consequently, groups of the users can access the links encapsulated within respective social bookmarks, though the groups of users in fact may never have viewed the associated content—a prerequisite for a traditional bookmark.

Social bookmarking services often encourage users in a social network to annotate bookmarks with meta-information referred to as "tags" rather than merely storing bookmarks in a traditional file hierarchy. As such, users processing tags for a social bookmark can view the social bookmark for content along with the tag pertaining to the bookmark, for instance a number of users having bookmarked the content. Further, some social bookmarking services infer clusters of bookmarks from the relationship of corresponding tags. Finally, many social bookmarking services provide subscription based feeds for lists of bookmarks, including lists organized by tags. Consequently, subscribers can become aware of new bookmarks as the bookmarks are saved, shared, and tagged by other users.

Tags have been extended from an social bookmarks referencing content, to the direct referencing of content absent a social bookmark. Consequently, in the circumstance of referencing underlying content, tags reflect a "bottom-up" type of classification for the content, compared to the hierarchical structure of content such as in a file system or index, which are "top-down" in nature. In a traditional hierarchical system, also known as a taxonomy, the designer of the taxonomy establishes a limited number of terms to use for classification, resulting in only one correct way to classify each item of content. In a tagging system, however, there are an unlimited number of ways to classify an item, and there is no "wrong" choice. Instead of belonging to one category, an item of content may have been tagged with several different tags.

BRIEF SUMMARY OF THE INVENTION

Embodiments of the present invention address deficiencies of the art in respect to generating a taxonomy for underlying content and provide a novel and non-obvious method, system and computer program product for generating a document taxonomy based upon tag data in groupings of tags. In an embodiment of the invention, a method for generating a document taxonomy of document subjects based upon tag data in groupings of tags has been claimed. The method includes retrieving into memory of a host computer different groupings of tags for correspondingly different documents providing a bottom-up view of the documents. The method further includes deriving a folksonomy of subjects from the groupings of tags for the documents and organizing the folksonomy into a hierarchy of nodes. Of note, each of the nodes can be associated with a different subject in the folksonomy. Finally, the method includes publishing the hierarchy of nodes as a taxonomy for the documents to provide a top-down view of the documents.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for generating a document taxonomy based upon tag data in groupings of tags. In an embodiment of the invention, a folksonomy of subjects can be determined from a grouping of tags as grouped by end users, and associated tag data, applied to respective content. Specifically, the folksonomy of subjects can be determined through a clustering of tags applied to corresponding content and arranged into tag groupings by the end users, and an analysis of relative weights of the tag groupings, and aggregated into a taxonomy of nodes, each node in the taxonomy reflecting a relationship of subjects of each of the tag groupings resulting from the analysis of the relative weights, and a comparison with their groupings as defined by end users. Subsequently, the content associated with the subjects can be referenced through the nodes of the taxonomy. In this way, the bottom-up approach of tagging can be integrated with the top-down approach of the taxonomy in order to flexibly reference the content.

Figure 1:
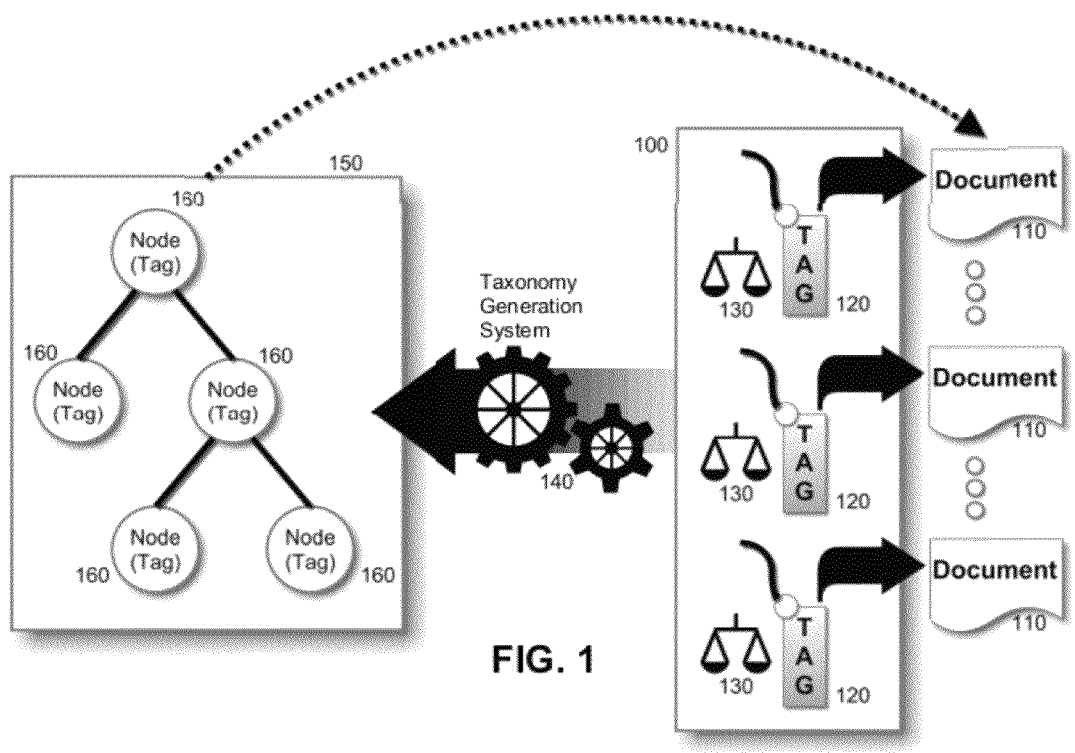
FIG. 1 is a pictorial illustration of a process for generating a document taxonomy based upon tag data in groupings of tags.

In further illustration, FIG. 1 is a pictorial illustration of a process for generating a document taxonomy based upon tag data in groupings of tags. As shown in FIG. 1, initially each of different tags 120 in a grouping of tags 100 for corresponding documents 110 can be weighted with weights 130 according to subjective relevance to a corresponding one of the documents 110. For instance, weights 130 can be derived according to a number of times corresponding ones of the tags 120 have been applied to a corresponding one of the documents 110. As another example, end users can indicate in binary fashion (like or dislike) whether or not a given one of the tags 120 applied to a corresponding one of the documents 110 is relevant or not relevant. A greater number of "likes" can result in a greater weighting than a lesser number of "likes", and a greater number of "dislikes" can reduce the weighting accordingly for each of the tags 120.

Subsequently, a taxonomy can be generated by taxonomy generation system 140 accounting for the different tags 120 and both homonyms and synonyms can be identified amongst the tags. Taxonomy generation system 140 can identify different subjects for the taxonomy by processing the tags 120 in the taxonomy using a non-overlapping clustering technique using tag similarity to identify subjects. Each cluster of tags identified is a subject. Thereafter, the documents 110 are associated with subjects based on the relevance of each of the tags in the subject on each of the subjects. Optionally, an extended list of tags is identified for each subject.

A folksonomy subsequently is generated by allowing users to create groups of the tags 120 and tag data for the groups is obtained. As before, both homonyms and synonyms for the groups are identified, and subjects 160 can be determined by comparing tag similarity in the groups using non-overlapping clustering to identify subjects 160. Each cluster of tags 120 common to a group is identified as a subject 160 as before. Thereafter, the documents 110 are associated with the subjects 160 based on the relevance of each of the tags 120 in the subject 160 on each of the subjects and again, optionally, an extended list of tags is identified for each subject. Each pair of subjects 160 is compared to determine relationships between subjects 160, for instance by using the extended list of tags 120 for each pair of subjects 160 to compare and identify which of the subjects 160 are related and children/parents of each other based on the presence or absence of key tags in the others extended tag list. Another method of comparing subjects 160 is to compare the documents 110 associated with each of the subjects 160.

A further stage of processing provides for the use of the subjects and associated tags generated from the tag weightings and tag groupings to produce a refined list of subjects 160 and their relationships, each of the subjects being linked back to an origin one of the documents 110. Using this information, a hierarchy 150 of subjects 160 is constructed. As such, the documents 110 are ordered in the taxonomy 150. As a folksonomy is always changing as users add more tags, a snapshot of a folksonomy is taken at a given time to generate the hierarchy 150 and may be regularly updated.

Figure 2:
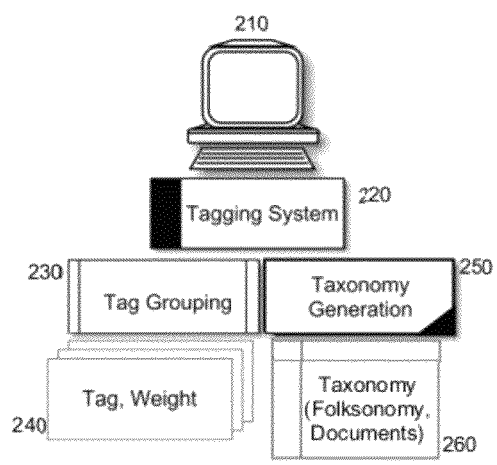
FIG. 2 is a schematic illustration of a taxonomy generation data processing system configured for generating a document taxonomy based upon tag data in groupings of tags; and, FIG. 3 is a flow chart illustrating a process for generating a document taxonomy based upon tag data in groupings of tags.

In further illustration, FIG. 2 schematically shows a taxonomy generation data processing system configured for generating a document taxonomy based upon tag data in groupings of tags. The system can include a host computer 210 with at least one processor and memory. The host computer 210 can support the execution therein of a tagging system 220 in which different documents can be tagged with one or more tags by different end users, whether through a user interface provided in the host computer 210, or through a remote interface to the host computer 210 from over a computer communications network (not shown). Tag grouping module 230 can be coupled to the tagging system 220. The tag grouping module 230 can include program code that when executed by the host computer 210 can group tags 240 applied to a corresponding document and compute weights for the tags 240 in the group.

Of note, taxonomy generation logic 250 can be coupled to the tagging system 220 and can include program code enabled upon execution in the host computer 210 to generate a taxonomy 260 for documents corresponding to the tags 240 in the group based upon a folksonomy derived from the tags 240. In this regard, sets of the tags 240 for each document can be sorted according to applied weights in order to infer parent-child relationships amongst the tags of each set. The inferred parent-child relationships can be aggregated for the documents to produce a taxonomy 260 of nodes in that each node can correspond to an entry in the folksonomy associated with one or more of the documents that correspond to the tags 240 in the group. Thereafter, the taxonomy 260 can be used to locate and access the documents in lieu of the tags providing a top-down approach to organizing the documents rather than the bottom-up approach of the tags 240.

Figure 3:
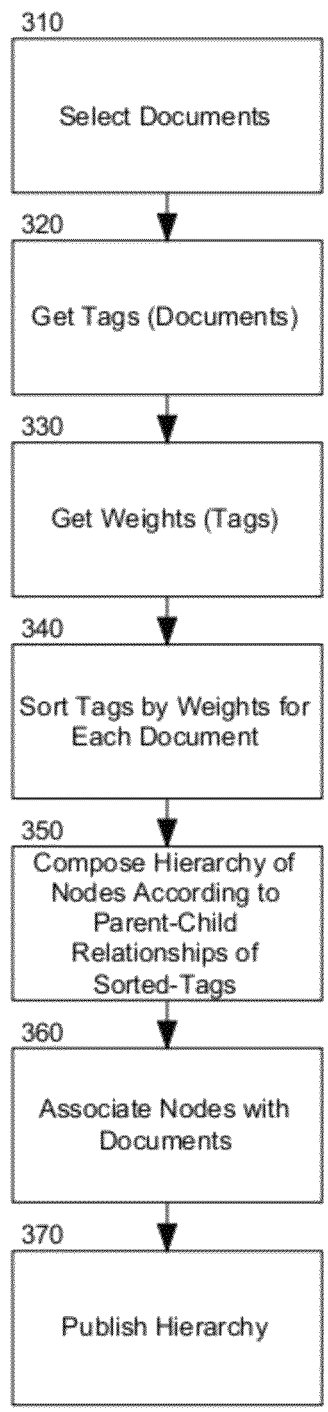

In even yet further illustration of the operation of the taxonomy generation logic 250, FIG. 3 is a flow chart illustrating a process for generating a document taxonomy based upon tag data in groupings of tags. The process can begin in block 310 with the selection of documents. In block 320, tags applied to each of the documents can be retrieved and weights established for the tags can be retrieved in block 330. In block 340, for each of the documents, applied ones of the tags can be sorted according to corresponding ones of the weights. Thereafter, in block 350, a hierarchy of nodes representative of a taxonomy for the documents can be composed according to parent-child relationships of the sorted tags for each document such that each of the nodes in the hierarchy reflects a tag and the collection of tags referenced by the nodes can be considered a folksonomy for the taxonomy. As such, in block 360, each node can be associated with one or more of the documents according to a tag value for the node. Finally, in block 370, the hierarchy of nodes can be published as a taxonomy for the documents.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method implemented by a computer comprising at least one processor for generating a document taxonomy based upon tag data in groupings of tags, the method comprising:

retrieving into memory of a host computer different groupings of tags for correspondingly different documents providing a bottom-up view of the documents, the tags comprising meta-information provided by users to annotate bookmarks associated with the documents;

deriving a folksonomy from the groupings of tags for the documents;

establishing weights for the tags in the groups;

inferring parent-child relationships amongst the groupings of tags based on sorting the tags for each document by the weights;

organizing the folksonomy into a hierarchy of nodes based on the inferred parent-child relationships, each of the nodes being associated with a different subject in the folksonomy; and, publishing the hierarchy of nodes as a taxonomy for the documents to provide a top-down view of the documents.

2. The method of claim 1, wherein deriving a folksonomy from the groupings of tags for the documents, comprises filtering the tags of the different groupings to tags for which at least a threshold weight has been established.

3. The method of claim 1, wherein organizing the folksonomy into a hierarchy of nodes, each of the nodes being associated with a different subject in the folksonomy, comprises:

aggregating parent-child relationships of the different subjects into a hierarchy of nodes wherein each of the nodes of the hierarchy corresponds to a different subject in the folksonomy and wherein each of the nodes excepting for a root node of the hierarchy has a parent relationship with a parent one of the nodes as a child of the parent one of the nodes.

4. A taxonomy generation data processing system configured for generating a document taxonomy based upon tag data in groupings of tags, the system comprising:

a host computer with at least one processor and memory;

a tagging system executing in the memory of the host computer;

tag grouping module coupled to the tagging system, the tag grouping module comprising program code enabled to group individual tags into different groupings of tags for different corresponding documents and establish weights for the tags in the groups, the tags comprising meta-information provided by users to annotate bookmarks associated with the documents; and, taxonomy generation logic executing in the memory of the host computer, the logic comprising program code enabled to:

derive a folksonomy from the groups of tags for the documents, infer parent-child relationships amongst the groupings of tags based on sorting the tags for each document by the weights;

organize the folksonomy into a hierarchy of nodes based on the inferred parent-child relationships, each of the nodes being associated with a different subject in the folksonomy; and publish the hierarchy of nodes as a taxonomy for the documents to provide a top-down view of the documents.

5. The system of claim 4, wherein the folksonomy is derived from the groupings of tags for the documents by filtering the tags of the different groups to tags for which at least a threshold weight has been established.

6. The system of claim 4, wherein the folksonomy is organized into a hierarchy of nodes wherein each of the nodes of the hierarchy corresponds to a different subject in the folksonomy and wherein each of the nodes excepting for a root node of the hierarchy has a parent relationship with a parent one of the nodes as a child of the parent one of the nodes.

7. A computer program product for generating a document taxonomy based upon tag data in groupings of tags, the computer program product comprising:

a computer readable hardware storage medium having computer readable program code embodied therewith, the computer readable program code comprising:

computer readable program code for retrieving into memory of a host computer different groupings of tags for correspondingly different documents providing a bottom-up view of the documents, the tags comprising meta-information provided by users to annotate bookmarks associated with the documents;

computer readable program code for deriving a folksonomy from the groupings of tags for the documents;

computer readable program code for establishing weights for the tags in the groups;

computer readable program code for inferring parent-child relationships amongst the groupings of tags based on sorting the tags for each document by the weights;

computer readable program code for organizing the folksonomy into a hierarchy of nodes based on the inferred parent-child relationships, each of the nodes being associated with a different subject in the folksonomy; and, computer readable program code for publishing the hierarchy of nodes as a taxonomy for the documents to provide a top-down view of the documents.

8. The computer program product of claim 7, wherein the computer readable program code for deriving a folksonomy from the groupings of tags for the documents, comprises computer readable program code for filtering the tags of the different groupings to tags for which at least a threshold weight has been established.

9. The computer program product of claim 7, wherein the computer readable program code for organizing the folksonomy into a hierarchy of nodes, each of the nodes being associated with a different entry in the folksonomy, comprises:

computer readable program code for aggregating the parent-child relationships of the different subjects into a hierarchy of nodes wherein each of the nodes of the hierarchy corresponds to a different subject in the folksonomy and wherein each of the nodes excepting for a root node of the hierarchy has a parent relationship with a parent one of the nodes as a child of the parent one of the nodes.

* * * * *